US010062033B2

(12) United States Patent
Lucey et al.

(10) Patent No.: US 10,062,033 B2
(45) Date of Patent: Aug. 28, 2018

(54) ANALYSIS OF TEAM BEHAVIORS USING ROLE AND FORMATION INFORMATION

(71) Applicant: Disney Enterprises, Burbank, CA (US)

(72) Inventors: Patrick Lucey, Pittsburgh, PA (US); Alina Bialkowski, Sinnamon Park (AU); George Peter Carr, Pittsburgh, PA (US); Iain Matthews, Pittsburgh, PA (US); Yisong Yue, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 842 days.

(21) Appl. No.: 14/498,977

(22) Filed: Sep. 26, 2014

(65) Prior Publication Data

US 2016/0092769 A1   Mar. 31, 2016

(51) Int. Cl.
G06F 15/18 (2006.01)
G06N 7/00 (2006.01)
G06K 9/00 (2006.01)

(52) U.S. Cl.
CPC ......... *G06N 7/005* (2013.01); *G06K 9/00724* (2013.01)

(58) Field of Classification Search
CPC .................................. G06K 9/00724
USPC ...................................... 706/12, 45
See application file for complete search history.

(56) References Cited

U.S. PATENT DOCUMENTS

| 2008/0114564 | A1* | 5/2008 | Ihara | G06F 17/30321 702/158 |
| 2009/0034793 | A1* | 2/2009 | Dong | G06K 9/00778 382/103 |
| 2010/0054694 | A1* | 3/2010 | Liu | G11B 27/034 386/285 |
| 2012/0274781 | A1* | 11/2012 | Shet | G06T 7/277 348/169 |

(Continued)

OTHER PUBLICATIONS

R. Adams, G. Dahl, and I. Murray. Incorporating Side Information in Probabilistic Matrix Factorization with Gaussin Processes. arXiv preprint arXiv:1003:4944, 2010.

(Continued)

*Primary Examiner* — David R Vincent
(74) *Attorney, Agent, or Firm* — Patterson + Sheridan, LLP

(57) ABSTRACT

Approaches are described for discovering a formation associated with an agent group engaging in an activity over a window of time. A formation analysis system computes first and second results for an objective function based on first and second sets of role assignments for each agent in the agent group at first and second moments in time, respectively. The formation analysis system iterates by: replacing the first set of role assignments with the second set of role assignments, and determining whether completion criteria have been met based at least in part on comparing the first result with the second result. If the completion criteria have not been met, then the formation analysis system replaces the second set of role assignments with a third set of role assignments that associate each agent in the first agent group with a different role assignment in the third set of role assignments at a third moment in time. If the completion criteria have been met, then the formation analysis system determines the first formation based on the second result.

20 Claims, 6 Drawing Sheets

(56) References Cited

U.S. PATENT DOCUMENTS

2015/0347846 A1* 12/2015 Guzm N-Rivera ............... G06K 9/6256 382/103

OTHER PUBLICATIONS

A.Bialkowski, P.Lucey, P.Carr, Y.Yue, andI.Matthews.Win at home and draw away: Automatic formation analysis highlighting the differences in home and away team behaviors. MIT Sloan Sports Analytics Conference, 2014.
A. Bocskocsky, J .Ezekowitz, and C.Stein.The Hot Hand:A New Approach to an Old Fallacy. MIT Sloan Sports Analytics Conference, 2014.
P. Carr, M.Mistry, and I.Matthews. Hybrid Robotic/Virtual Pan-Tilt-Zoom Cameras for Autonomous Event Recording. ACM Multimedia, 2013.
D.Cervone, A.D'Amour, L.Bornn, and K.Goldsberry. POINTWISE: Predicting Points and Valuing Decisions in Real Time with NBA Optical Tracking Data. MIT Sloan Sports Analytics Conference, 2014.
A.Dempster, N.Laird, and D.Rubin. Maximum Likelihood from in complete Data via the EM Algorithm.Journal of the Royal Statistical Society,39(1):11-38, 1977.
N.Djuric and S.Vucetic, Efficient visualization of large-scale data in tables through reordering and entropy minimization. In ICDM, 2013.
C. Boersch, S. Singh, A Gupta, J. Sivic, and A. Efros. What Makes Paris Look Like Paris? ACM Transactions on Graphics (SIG-GRPAH), 31(4), 2012.
G. Ganespapillai and J. Guttag. A Data-Driven Method for In-Game Decision Making in MLB. MIT Sloan Sports Analytics Conference, 2014.
K. Goldsberry, CourtVision: New Visual and Spatial Analytics for the NBA. MIT Sloan Sports Analytics Conference, 2014.
H.W. Kuhn. The hungarian method for the assignment problem. Naval Research Logistics Quarterly, 2 (1-2): 83-97, 1955.
Y. Lee and S. CHoi, Minimum Entropy, K-Means, Spectral Clustering. In International Joint Conference on Neural Networks, 2004.
Y. Lee, A. Efros, and M. Hebert. Sytle-Aware Mid-Level Representation for Discovering Visual Connections in Space and Time. ICCV , 2013.
P. Lucey, A. Bialkowski, P. Carr, E. Foote, and I. Matthews. Characterizing Multi-Agent Team Behavior from Partial Team Tracings: Evidence from the English Premier League, AAAI, 2012.
P. Lucey, A. Bialkowski, P. Carr, S. Morgan and L Matthews and Y. Sheikh. Representing and Discovering Adversarial Team Behaviors using Player Roles. CVPR, 2013.
P. Lucey, A. Bialkowski, P. Carr, Y. Yue, and I. Matthews, Analyzing Team Movement in Basketball using Tracking Data. MIT Sloan Sports Analytics Conference, 2014.
P. Lucey, D. Oliver, P. Carr, J. Roth, and I. Matthews. Assessing team strategy using spatiotemporal data. ACM SIGKDD, 2013.
R. Masheswaran, Y. Chang, A. Henehan, and S. Danesis. Destructing thye Rebound with Optical Tracking Data. MIT Sloan Sports Analytics Conference, 2012.
R. Masheswaran, Y. Chang, J. Su, S. Kwok, T. Levy, A. Wexler, and N. Hollingsworth. The Three Dimensions of Rebounding. MIT Sloan Sports Analytics Conference, 2014.
A. Miller, L. Bornn, R. Adams, and K. Goldsberry. Factorized Point Process Intensities: A Spatial Analysis of Professional Basketball, ICML, 2014.
Opta Sports. www.otasports.com.
D. Parikh and K. Grauman. Relative Attributes. ICCV, 2011.
Prozone. www.prozonesports.com.
S. Roberts, R. Everson, and I. Rezek. Minimum Entropy Data Partitioning, IET, pp. 844-849, 1999.
S. Sinha, C. Dyer, K. Gimpel, and N. Smith. Predicting the NFL Using Twitter. ECML Workshop on Machine Learning and Data Mining for Sports Analytics, 2013.
STATS SportsVU. www.sportvu.com.
D. Sutherland, B. Poczos, and J. Schnieder. Active Learning and Search on Low-Rank Matrices. In ACM SIGKDD, 2013.
J. Tenebaum and W. Freeman. Separating Style and Content with Bilinear Models. Neural Computation, 12(6): 1247-1283, 2000.
X. Wei, P. Lucey, S. Morgan, and S. Sridharan. Predicting Shot Locations in Tennis using Spatiotemporal Data. DICTA, 2013.
X. Wei, P. Lucey, S. Morgan, and S. Sridharan. Sweet-Spot: Using Spatiotemporal Data to Discover and Predict Shots in Tennis. MIT Sloan Sports Analytics Conference, 2013.
X. Wei, L. Sha, P. Lucey, S. Morgan, and S. Sridharan. Large-Scale Analysis of Formations in Soccer. DICTA, 2013.
J. Weins, G. Balakrishnan, J. Brooks, and J. Guttag. To Crash or Not to Crash: A quantitative look at the relationship between the offensive rebounding and transition defense in the NBA. MITA Sloan Sports Analytics Conference, 2013.
J. Wilson, "Inverting the Pyramid: The History of Football Tactics," Orion Books, 2008.
C. Anderson and D. Sally, "The Numbers Game: Why Everything You Know About Soccer is Wrong," Penguin Books, 2013.
T. Moskowitz and L. Wertheim. Scorecasting: The Hidden Influences Behind How Sports Are Played and Games Are Won, Crown Publishing Group, 2011.

* cited by examiner

ANALYSIS OF TEAM BEHAVIORS USING ROLE AND FORMATION INFORMATION

BACKGROUND

Field

The present application relates to artificial intelligence systems used to analyze participants engaged in an activity and, in particular, to analysis of team behaviors using role and formation information.

Description of the Related Art

In possession-based sports, such as soccer and basketball, players typically maintain a spatial arrangement or "formation," where a formation is a formal arrangement of a number of persons or things acting as a unit in order to optimize the chance of achieving one or more objectives. The formation is generally defined in terms of a set of roles, where players adopt specific roles associated with the formation. As play progresses, players may change or swap roles to achieve team objectives, such as to respond to the adversarial team's movements or to score a goal. A team may dynamically change from one formation to another, which may involve some or all players adopting a new role associated with the new position.

Vision-based player tracking systems have been deployed to track the movement of the players during a game or match. Tracking systems may also track the movement of an object of play, such as the position of the ball in possession-based sports. This tracking data is often archived over multiple games, whereby coaches, sports analysts, and broadcasters may access tracking data for entire games spanning one or more seasons of a given sport. In order to make use of this tracking data, the coach, analyst, or broadcaster first qualitatively determines the team formation, and the corresponding player roles, by examining the tracking data or video footage of the game. The coach, analyst, or broadcaster makes this qualitative determination based on experience and knowledge of the associated sport.

One drawback with the approach described above is that this process of manually identifying team formation and corresponding player roles is time consuming and prone to error. As one example, annotating one frame of player tracking data could take thirty seconds for basketball, where each team has five players, and one minute for soccer, where each team has ten players plus a goalkeeper. If each game has sixty minutes of play, and tracking data is recorded thirty times per second, then there would be 108,000 frames of tracking data to annotate for each game. In addition, different analysts could come to different conclusions about team formation and player roles for the same tracking data, based on differing levels of experience and expertise in sports analysis among the analysts. As a result, only a small sampling of the total number of tracking data frames would be annotated, and annotation results could be inconsistent across large tracking data sets—such as tracking data that covers a full season or more of play. Such inconsistency would hinder effective analysis of team behavior across multiple games.

SUMMARY

One embodiment of the present application sets forth a method for discovering a formation associated with a first agent group engaging in an activity over a window of time. The method includes associating an initial role assignment from a first set of role assignments with each agent in the first agent group. The method further includes computing a first probability distribution function for each agent in the first agent group based on the first set of role assignments. The method further includes, for each data frame in a first plurality of data frames comprising spatiotemporal data for the first agent group, assigning a different role assignment from a second set of role assignments to each data point in a set of data points associated with the data frame. The method further includes computing a second probability distribution function based on the second set of role assignments. Finally, the method further includes determining the first formation associated with the first agent group based on the second probability distribution function.

One embodiment of the present application sets forth a method for discovering a first formation associated with a first agent group from a plurality of agent groups engaging in an activity over a window of time. The method includes computing a first result for an objective function based on a first set of role assignments that associate each agent in the first agent group with a different role assignment in the first set of role assignments at a first moment in time. The method further includes computing a second result for the objective function based on a second set of role assignments that associate each agent in the first agent group with a different role assignment in the second set of role assignments at a second moment in time.

The method further includes performing an iteration step, the iteration step including replacing the first set of role assignments with the second set of role assignments. The iteration further including determining whether completion criteria have been met based at least in part on comparing the first result with the second result. The iteration further including, if the completion criteria have not been met, then replacing the second set of role assignments with a third set of role assignments that associate each agent in the first agent group with a different role assignment in the third set of role assignments at a third moment in time. The iteration further including, if the completion criteria have been met, then determining the first formation based on the second result.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a computing system configured to implement one or more aspects of the disclosed methods.

BRIEF DESCRIPTION OF THE DRAWINGS

So that the manner in which the above recited features of the application can be understood in detail, a more particular description of the application, briefly summarized above, may be had by reference to embodiments, some of which are illustrated in the appended drawings. It is to be noted, however, that the appended drawings illustrate only typical embodiments of this application and are therefore not to be considered limiting of its scope, for the application may admit to other equally effective embodiments.

DETAILED DESCRIPTION

Figure 1:
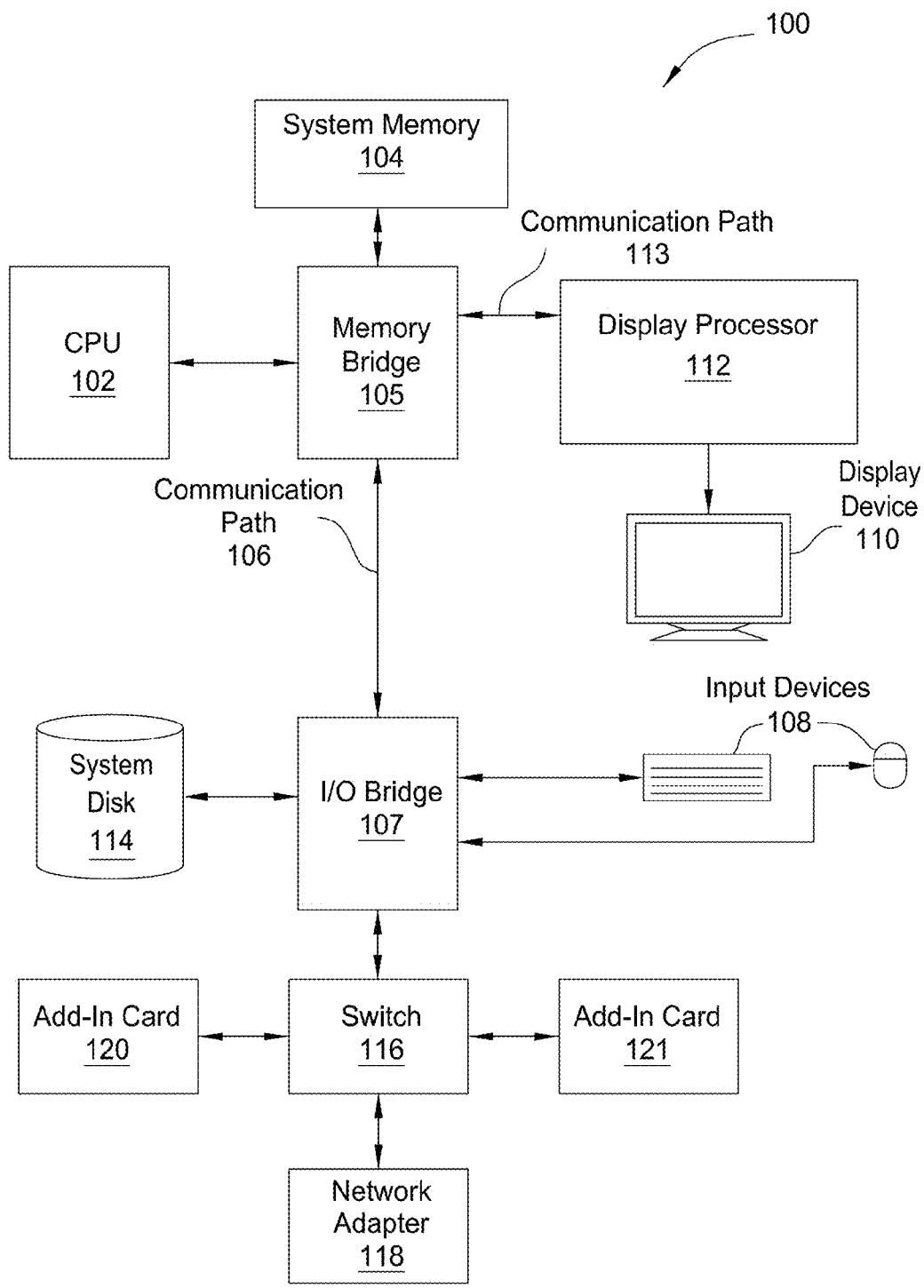
FIG. 1 depicts one architecture of a system within which embodiments of the present application may be implemented.

In the following, reference is made to embodiments. However, it should be understood that the application is not limited to specific described embodiments. Instead, any combination of the following features and elements, whether related to different embodiments or not, is contemplated to implement and practice the application. Furthermore, although embodiments of the application may achieve advantages over other possible solutions and over the prior art, whether or not a particular advantage is achieved by a given embodiment is not limiting of the application. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Approaches are described for discovering a formation associated with an agent group engaging in an activity. A formation analysis system associates a global or long-term role assignment estimated over a period of time. The formation analysis system computes a first probability density function for each agent in the agent group based on the first set of role assignments. For each data frame in a plurality of data frames comprising tracking data for the agent group, the formation analysis system assigns a different role assignment from a second set of role assignments to each data point in a set of data points associated with the data frame. The formation analysis system computes a second probability density function based on the second set of role assignments. This iterative procedure continues until convergence of a pre-defined objective function or until a maximum quantity of iterations is performed. Finally, the formation analysis system determines the formation based on the second probability density function based on the final solution of the iterative process.

As will be appreciated by one skilled in the art, aspects of the present application may be embodied as a system, method or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present application may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present application are described below with reference to flowchart illustrations and block diagrams of methods, apparatus (systems) and computer program products according to embodiments of the application. It will be understood that each block of the flowchart illustrations and block diagrams, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and block diagram block or blocks. Such computer, other programmable apparatus or other device may include, without limitation, a personal computer, video game console, personal digital assistant, rendering engine, mobile device, or dedicated hardware platform, such as a very large scale integrated (VLSI) circuit, a field-programmable gate array (FPGA), or an application specific integrated circuit (ASIC).

Hardware Overview

FIG. 1 depicts one architecture of a system 100 within which embodiments of the present application may be implemented. This figure in no way limits or is intended to limit the scope of the present application.

System 100 may be a personal computer, video game console, personal digital assistant, rendering engine, or any other device suitable for practicing one or more embodiments of the present application.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and microphones) and forwards the input to CPU 102 via memory bridge 105. In one embodiment, the computer system 100 is configured to implement an assignment analysis system that may receive player detection location data and assign player identities and roles to the player detection location data, as further described herein.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present application, instructions and data representing a scene are provided to a render farm or a set of server computers, each similar to system 100, via network adapter 118 or system disk 114. The render farm generates one or more rendered images of the scene using the provided instructions and data. These rendered images may be stored on computer-readable media in a digital format and optionally returned to system 100 for display. Similarly, stereo image pairs or multiview autostereoscopic images processed by display processor 112 may be output to other systems for display, stored in system disk 114, or stored on computer-readable media in a digital format.

Alternatively, CPU 102 provides display processor 112 with data and instructions defining the desired output images, from which display processor 112 generates the pixel data of one or more output images, including characterizing and adjusting the offset between stereo image pairs, in the case of stereoscopic images, or generating and interleaving multiple views, in the case of multiview autostereoscopic images. The data and instructions defining the desired output images can be stored in system memory 104 or graphics memory within display processor 112. For example, CPU 102 could execute a client media player application (not shown) that receives a media stream from a content provider, and transmits the media stream to the display processor 112 for viewing on the display device 110. In an embodiment, display processor 112 includes 3D rendering capabilities for generating pixel data for output images from instructions and data defining the geometry, lighting shading, texturing, motion, and camera parameters for a scene. Display processor 112 can further include one or more programmable execution units capable of executing shader programs, tone mapping programs, and the like.

CPU 102, render farm, and or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Large-Scale Analysis of Team Behaviors Using Role and Formation Information

Figure 2:
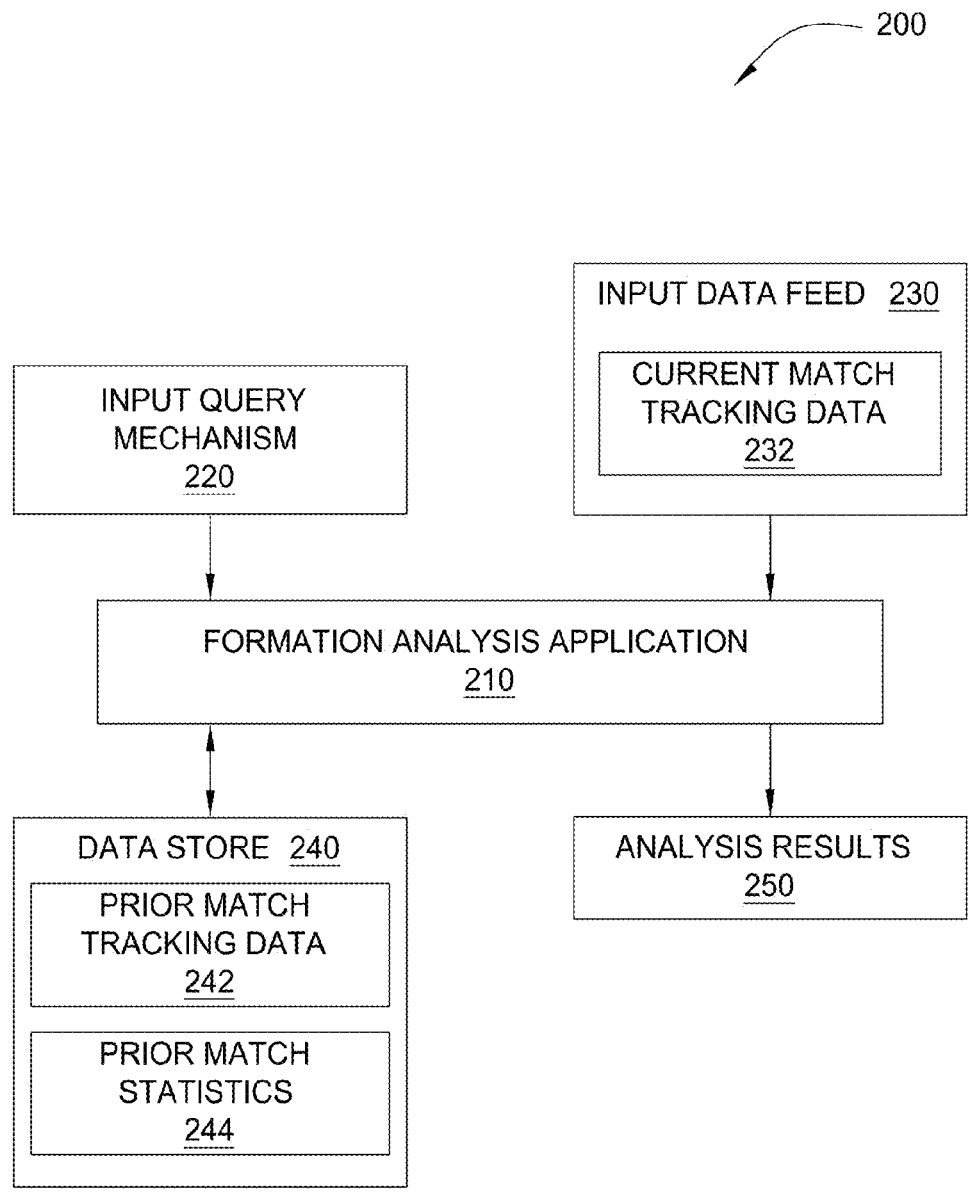
FIG. 2 illustrates a formation analysis system that may be implemented on the system of FIG. 1, according to one embodiment of the present application.

FIG. 2 illustrates a formation analysis system 200 that may be implemented on the system of FIG. 1, according to one embodiment of the present application. As shown, the formation analysis system 200 includes a formation analysis application 210, input devices 220, an input data feed 230, a system disk 240, and analysis results 250. The input devices 220 and the system disk 240 function substantially the same as described in conjunction with FIG. 1, except as further described below.

Figure 3:
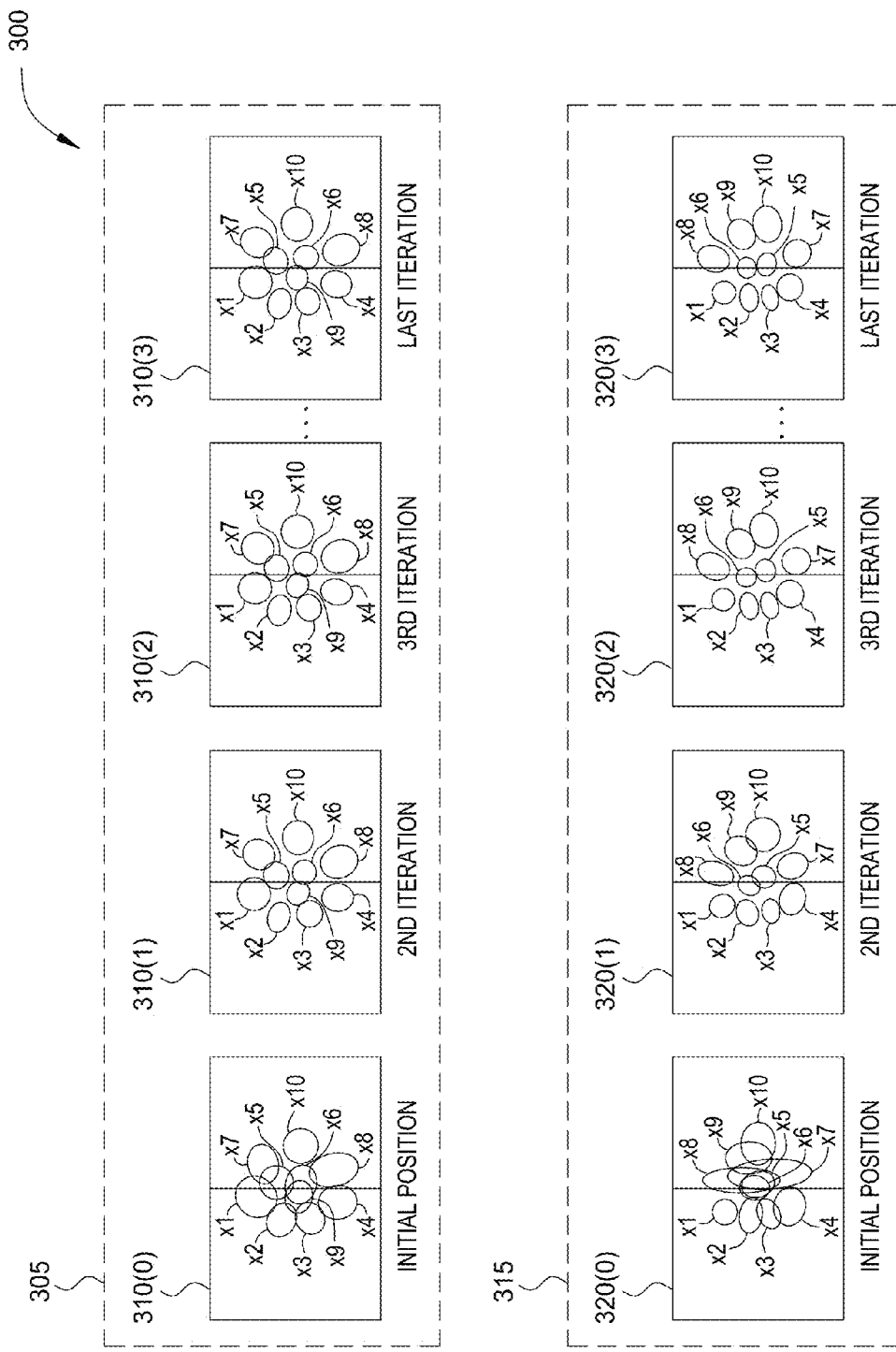
FIG. 3 illustrates a series of role assignment iterations, according to one embodiment of the present application.
Figure 4:
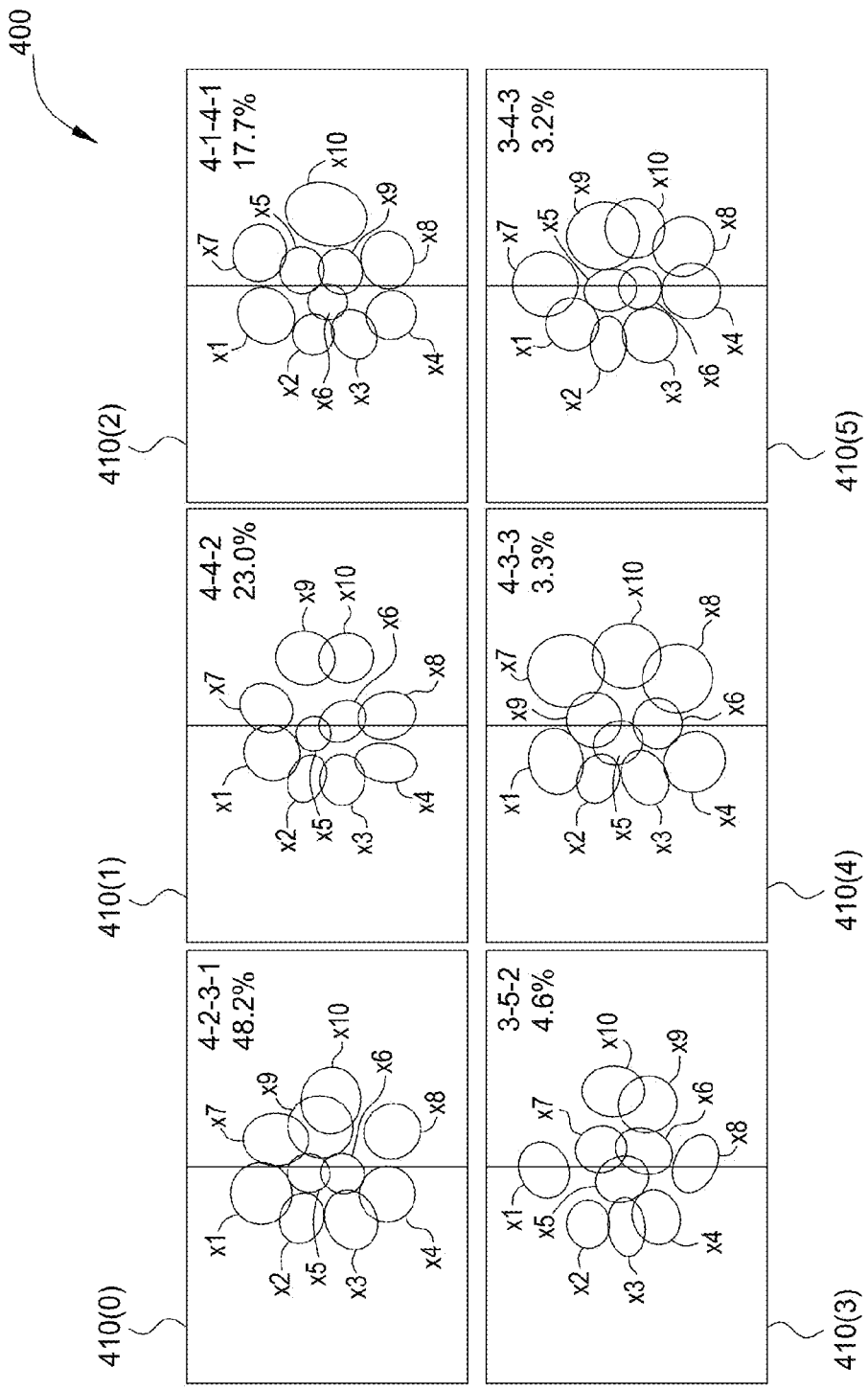
FIG. 4 illustrates a set of team formations after formation clustering, according to one embodiment of the present application.

The formation analysis application 210 is a software program including instructions that, when executed, performs the techniques described in conjunction with FIGS. 3-5. The formation analysis application 210 may reside in system memory 104 of the system of FIG. 1, such that the instructions of the software program may be retrieved and executed by the CPU 102.

The input query mechanism 220 receives one or more input queries, such as a request from a user, and transmit the queries to the formation analysis application 210. For example, the input query mechanism 220 could receive a query requesting that the input data feed 230 for the current match be analyzed in light of data from prior matches retrieved from the data store 240 in order to determine whether the style of play exhibited by the teams playing in the current match are similar to or different from the teams' style of play in prior matches. The input query mechanism 220 may provide data to the formation analysis application 210 via one or more input devices 108.

The input data feed 230 provides information regarding the current match to the formation analysis application 210, including, without limitation, tracking data associated with the location of one or more players, tracking location of a game ball or other object of interest, or match statistics. Tracking data associated with the ball or players may include spatiotemporal data specifying the location of the ball or the location of one or more players at discrete points in time. For example, tracking data could include location of the game ball and player on the field at ⅟25 second intervals. Such tracking data may be machine-generated by a tracking system, although tracking data may be manually annotated by humans. As shown, the input data feed 230 includes current match tracking data 232. The current match tracking data 232 includes player tracking data frames, where each data frame includes the location of one or more players in the current match at a specific moment in time. In some embodiments, the current match tracking data 232 also includes tracking data for an object of interest such as a ball, including, without limitation, the position of a ball on the field, timing information regarding the ball, the type of play being performed (such as a pass, tackle, or take on), and an indicator as to whether the play was successful. The input data feed 230 may provide data to the formation analysis application 210 via one or more input devices 108.

The data store 240 provides information regarding the prior matches to the formation analysis application 210. As shown, the data store 240 includes prior match tracking data 242 and prior match statistics 244. The prior match tracking data 242 includes player tracking data frames from one or more prior matches, where each data frame includes the location of one or more players in a particular prior match at a specific moment in time. The prior match tracking data 242 may also include information from prior matches regarding ball movement, including, without limitation, the position of the ball on the field, timing information regarding the ball, the type of play being performed (such as a pass, tackle, or take on), and an indicator as to whether the play was successful. The prior match statistics 244 include standard match statistics for prior matches typically used in analysis, including, without limitation, goals, shots on target, shots off target, passes, corners, yellow cards, and red cards. The data store 240 may be located within the system disk 114.

The analysis results 250 represent the results of the analysis performed by the formation analysis application 210. In one example, the formation analysis application 210 could iteratively generate role assignments corresponding to the current match tracking data 232. As further described below, the formation analysis application 210 could create an initial position created by tracking movement as a function of player identity without considering player roles. The formation analysis application 210 could then generate a series of role assignment iterations that refine the correspondence between the player roles and the current match tracking data 232. The formation analysis application 210 would then continue to generate additional role assignment iterations until convergence is reached or until a maximum iteration count is reached. In another example, the formation analysis application 210 could select particular plays from prior matches most closely resembling a play of interest for the current match and could store information regarding the selected plays in the analysis results 250. In yet another example, the formation analysis application 210 could predict one or more outcomes for a current match based on an analysis of current match tracking data 232 versus prior match tracking data 242 and prior match statistics 244. The predicted outcomes could be stored in the analysis results 250. The analysis results 250 may be transmitted to the display processor 112 for presentation on the display device 110.

FIG. 3 illustrates a series of role assignment iterations 300, according to one embodiment of the present application. As shown, the series of role assignment iterations 300 includes a first series 305 and a second series 315.

The first series 305 includes four illustrative iterations, including an initial position 310(0), a second iteration 310(1), a third iteration 310(2), and a last iteration 310(3). The initial position 310(0), created by tracking movement as a function of player identity without considering player roles, shows significant overlap over time, particularly among the three players identified as x5, x6, and x9. The second iteration 310(1) and the third iteration 310(2) illustrate better separation among the ten roles performed by the players. The last iteration 310(3) identifies the team formation as a 4-1-4-1 formation, where the players form four ranks that include four players, two players, three players, and one player, respectively. The first rank of four players includes players x1, x2, x3, and x4. The second rank of one player includes player x9. The third rank of four players includes players x7, x5, x6, and x8. The fourth rank of one player includes player x10.

The second series 315 includes four illustrative iterations, including an initial position 320(0), a second iteration 320(1), a third iteration 320(2), and a last iteration 320(3). The initial position 320(0), created by tracking movement as a function of player identity without considering player roles, also shows significant overlap over time, particularly among the three players identified as x5, x6, x7, and x8. The second iteration 320(1) and the third iteration 320(2) illustrate better separation among the ten roles performed by the players. The last iteration 320(3) identifies the team formation as a 4-4-2 formation, where the players form three ranks that include four players, four players, and two players, respectively. The first rank of four players includes players x1, x2, x3, and x4. The second rank of two players includes players x5, x6, x7, and x8. The third rank of two players includes players x9 and x10.

As further described below, the formation analysis system 200 assigns roles to tracking data points. The formation analysis system 200 then generates role assignment iterations until the team formation reaches convergence, as determined by the difference between a current and previous iteration being less than a given threshold, or by reaching a maximum quantity of iterations.

Players, also known as agents, on a team sport are typically identified by one or more non-changing attributes, such as player name, jersey number, or some other characteristic property associated with the players. Per-player tracking data captured during a game or match are typically indexed based on these non-changing attributes. For example, each frame of tracking data for a particular game could include a location for one or more players, where each location is identified as corresponding to a player name or jersey number.

Team formations, however, are typically defined with respect to a set of roles, rather than with respect to a specific set of players. A team includes a set of $\mathcal{P}$ players who are dynamically assigned to a set $\mathcal{R}$ of roles. In one example, one or more players on a five-member basketball team could be assigned to a different role selected from $\mathcal{R}$ ={point-guard (PG), shooting-guard (SG), center (C), small-forward (SF), power-forward (PF)}. In another example, one or more players on an eleven-member soccer team could be assigned to a different role selected from $\mathcal{R}$ ={goal-keeper (GK), left-back (LB), left-center-back (LCB), right-center-back (RCB), right-back (RB), left-center-middle (LCM), right-center-middle (RCM), left-wing (LW), center-middle (CM), right-wing (RW), striker (S)}. Such a role set could be associated with a 4-2-3-1 formation, so named because four players assume the role of full-backs (LB, LCB, RCB, RB), followed by two holding mid-fielders (LCM, RCM), followed by three attacking mid-fielders (LW, CM, RW), followed by a single striker (S). In yet another example, one or more players on the eleven-member soccer team could be assigned to a different role selected from $\mathcal{R}$ ={goal-keeper (GK), left-back (LB), left-center-back (LCB), right-center-back (RCB), right-back (RB), left-wing (LW), left-center-middle (LCM), right-center-middle (RCM), right-wing (RW), striker 1 (S1), striker 2 (S2)}. Such a role set could be associated with a 4-4-2 formation, so named because four players assume the role of full-backs (LB, LCB, RCB, RB), followed by four mid-fielders (LW, LCM, RCM, RW), followed by two strikers (S1, S2). Many other role sets corresponding to other team formations are also possible.

Player tracking data is generated as a series of data frames, where each data frame includes the data points corresponding to the location of one or more players at a specific point in time. Multiple data frames of tracking data may be generated during each second of play. For example, the tracking data could include thirty data frames for each second of play.

In order to determine team formation, tracking data for each data frame is compared to a set of roles, and each location in a given data frame is assigned to a different role in the set of roles. Each data frame in the tracking data includes a set $\mathcal{D}_t = \{(x,y)_1, \ldots, (x,y)_N\}$ of detected 2D locations for the N players at a particular time instant t. For each data frame, a role r is assigned to each (x,y) detected location. For each data frame, player detection locations are assigned to roles. In one embodiment, each detection location is assigned to a different role, and every role is assigned to one player detection location. However, the assignment of roles to players may change dynamically over time as the game progresses. In other words, a player may have multiple roles during a game. An assignment of N roles to the set of detected locations in a data frame may be viewed as a permutation, whereby at each time instant, the detections are permuted to maintain a consistent role ordering over a set of data frames. The role representation for a set of detected locations at a given time instant $r_t$ may be defined by Equation 1 below:

$$r_t = x_t d_t \qquad \text{Equation 1}$$

where $x_t$ is the permutation matrix that maps detections to roles, and $d_t$ is an arbitrary vector ordering of the set of detections $\mathcal{D}_t$.

Because roles are defined by spatial properties associated with the location of one or more players on the field and the location of the players relative each other, the roles for a set of (x,y) detected locations may be determined using various techniques, including without limitation, comparing field positions to various formations in a codebook, the shape context formed by the players on the field, and via normalized occupancy maps.

A given set of known formations may be recorded in a codebook, where the codebook stores a set of exemplar formations $\mathcal{F} = [\hat{r}_1, \ldots, \hat{r}_M]^T$ chosen from a training set T of formations, where each r̂ is a prototype exemplar for a given formation, and M is the number of exemplars.

To select a given prototype exemplar for a set of tracking data, the mean location and range of the detected 2D locations in a data frame is compared with the mean and range for each exemplar in the codebook. The codebook exemplar with the minimum difference, or error, when compared versus detected 2D locations is selected. Alternatively, a regression function could be applied to each exemplar in the codebook versus the detected 2D locations to select an appropriate exemplar r̂ from the codebook, the cost matrix describing the cost function to assign a particular role to a particular detected location may calculated as the Euclidean distance between each detected location and each prototype role position. An example of such a regression function is given by Equation 2 below:

$$C^{CB}(i,j)=\|d_t(i)-\hat{r}(j)\|_2 \qquad \text{Equation 2}$$

where i refers to a given detection i and j refers to a given role j in the exemplar formation.

Alternatively, roles may be assigned to the detected 2D locations in a data frame using shape contexts, where the shapes formed by the players on the field identify the particular formation. With shape context, the likelihood of assigning a particular role to a detected location (x,y) is evaluated by considering the relative locations of the players on the field rather than the absolute locations of the players. Specifically, all detected locations $\{\mathcal{D}_t \backslash \mathcal{D}_t(i)\}$ are expressed in coordinates relative to each detected location in the data frame $\mathcal{D}_t(i)$. This approach is consistent with the idea that formations are typically defined by relative positions of the players. In soccer, for example, the left-wing would be in front of and to the left of all other players. Equivalently, all players would be behind and to the right of the left-wing. The formation analysis system 200 computes a descriptor $G(\mathcal{D}_t(i))$ for each detected location $(x,y)_i$ in the data frame $\mathcal{D}_t$ by computing the locations of the remaining detections in $\mathcal{D}_t$ relative to $(x,y)_i$. The formation analysis system 200 performs a coarse quantization of the relative displacements in terms of angle, categorizing a given player as in front of, behind, left, or right of one or more other players. The formation analysis system 200 then learns an exemplar descriptor $G(\mathcal{R}(j))$ for each role using the labeled data from the coarse quantization. The cost function for assigning a particular role to a detection is based on the distance between the descriptor generated for the $(x,y)_j$ location and the learned exemplar descriptor for the hypothesized role. One example of such a cost function is given by Equation 3 below:

$$C^{SC}(i,j)=d(G(\mathcal{D}_t(i)),G(\mathcal{R}(j))) \qquad \text{Equation 3}$$

where, in one embodiment, the distance function d may be the chi-squared distance.

Alternatively, roles may be assigned to the detected 2D locations in a data frame using a probability distribution function for each role within the formation, where a probability distribution function refers to a probability function associated with one or more discrete variables. By contrast, a probability density function refers to a probability function associated with one or more continuous variables. This probability distribution function is expressed as normalized occupancy maps, which are also referred to as "heat-maps" because when visualized, each normalized occupancy map appears to be "hot" in the areas of the field or court where the corresponding player is most likely to be located. Such an occupancy map, or heat map, is basically a probability distribution function. However, if the occupancy map is quantized sufficiently fine, the occupancy map approximates a probability density function. The team formation can be described as a set of probability distributions, $\mathcal{F}=[p_1, \ldots, p_N]^T$, where $p_n$ is the vectorized 2D probability function of the nth role. The formation analysis system 200 learns the 2D probability distribution function of each role by dividing the playing surface, such as the field or court, into a collection of discrete cells. The formation analysis system 200 then generates frequency counts of how often each role occupies each cell based on human labeled exemplar data. Given a set of detections in a data frame $\mathcal{D}_t$, the formation analysis system 200 computes the probability of each individual role assignment to each detected location (x,y) in the data frame $\mathcal{D}_t$ by computing a cost function, such as the cost function given by Equation 4 below:

$$C^{HM}(i,j)=-\log P(\mathcal{R}(j)|\mathcal{D}_t(i)) \qquad \text{Equation 4}$$

The formation analysis system 200 combines the results for the individual role assignments to generate an energy function that reflects the probability of the role assignments $r_t$.

The formation analysis system 200 then resolves the various cost matrices $C^{CB}$, $C^{SC}$, $C^{HM}$ corresponding to the role descriptor approaches described above via a linear assignment approach such as the Munkres-Kuhn algorithm, also referred to as the Hungarian algorithm. The Hungarian method is an optimization algorithm that resolves assignment problems by determining a lowest cost path. During certain periods of play, the assignment of roles to detected locations may be ambiguous, such as when players cross each others' paths or are in the process of switching roles with each other. In such cases, the formation analysis system 200 may have difficulty in determining which role should correspond to a particular detected location (x,y).

Typically, a set of detections in a data frame $\mathcal{D}_t$ may have multiple feasible assignments of roles. Slight changes in player locations may alter the selection of the selected formation between one frame and the next. As a result, certain motion patterns during play may cause the selected formation to change rapidly from frame-to-frame over a period of time, resulting in a phenomenon referred to as "flickering." To reduce this flickering, an approximately optimal sequence is determined such that the selected team formation remains consistent over a period of time. This approximately optimal sequence is determined by searching for a consistent temporal configuration of role assignments among the top k independent solution candidates produced for each data frame in a sequence, where k is selected heuristically based on balancing accuracy of results with computational efficiency. Given N total detected locations per frame, a total of N! permutations of role to detected location mappings are possible. As N increases, the computational demands of analyzing all N! possible permutations increases dramatically. Typically, however, only a handful of the N! possible permutations are feasible, based on the tactical and strategic responsibilities of each role. For example, a striker would typically be the frontmost player in a given formation. As a result, the role of striker would not be assigned to the players at the rearmost locations in the data frame. Therefore, in one embodiment, a group of k "best candidate assignments" are selected from the N! possible permutations using Murty's k best assignments approach to identify a likely subset $\{\hat{r}_t\}$ of feasible permutations. Each permutation in the subset $\{\hat{r}_t\}$ is then evaluated for the data frames encompassing a short period of time to find the permutation that produces the most consistently accurate solution.

In certain sports, such as soccer, players on a team may exhibit a long-term strategy, as exemplified by maintaining a set of roles with a formation and moving in that formation over relatively long periods of time, changing formations relatively rarely as compared with certain other sports. Such a long-term strategy may be contrasted with other sports, such as American football, where the formation may change for every play. The long term behavior of a team, as exemplified by the formation and roles adopted by the team over time, may provide an indication of the overall team strategy. However, traditional approaches to labeling and player roles may be subjective and difficult to implement as formations change due to a team's high level strategy. In other words, the player roles and team formation at any given time may not correspond to any pre-defined formations selected from the codebook or shape contexts, or other pre-defined approaches that assume a team formation remains relatively constant over time. An approach for automatically determining team formation from tracking data, as determined by player location and range of motion over time relative to other players, may be beneficial in providing insight into team strategy. A set of typical formations may be predefined on the basis of prior knowledge, whereby roles are assigned to players based on selecting a formation from the set of pre-defined formations. Although team formation changes relatively rarely during certain sports, such as soccer, a team may, nevertheless, employ several different formations over the course of a full match. Consequently, role assignment is facilitated if the team formation is determined automatically from the tracking data, as changes in team formation occur. Such automatic detection of team formation may be accomplished via an expectation-maximization (EM) approach. Roles may then be assigned to players according to the automatically determined formation. This expectation-maximization approach is outlined in Table 1, as presented below:

TABLE 1

1. procedure ROLE($\mathcal{R}(\mathcal{D})$))
2.    Calculate mean of detections, $\bar{\mathcal{D}} = \frac{1}{T}\sum_t^T \mathcal{D}_t$
3.    Determine initial role ordering, $\hat{\mathcal{R}} \leftarrow \bar{\mathcal{D}}$
4.    while $\nabla \bar{\mathcal{R}}$ < threshold or iterations < max do
5.      for 1 to T do
6.        Assign role for $\mathcal{R}_t$ based on $\bar{\mathcal{R}}$
7.      end for
8.      Update mean, $\bar{\mathcal{R}}$
9.      Calculate change in mean, $\nabla \bar{\mathcal{R}}$
10.   end while
11.   return $\hat{\mathcal{R}}^* \leftarrow \hat{\mathcal{R}}$ ; final role representation
12. end procedure At line 2, the formation analysis system 200 calculates the mean of the detections $\bar{\mathcal{D}}$ according to player identity over a period of time, such as a half of a game. This mean of detections by player identity yields a reasonable initial approximation of role assignments, due to the fact that players typically adhere to a single role during a majority of time. At line 3, the formation analysis system 200 determines an initial role ordering $\hat{\mathcal{R}} \leftarrow \bar{\mathcal{D}}$ based on the mean of detection data. At lines 5-7, the formation analysis system 200 applies the current role ordering $\hat{\mathcal{R}} \leftarrow \bar{\mathcal{D}}$ to each frame in the period of time, using the Hungarian algorithm using the $L_2$ (Euclidean) distance to determine each individual role $\mathcal{R}_i$. At line 8, the formation analysis system 200 calculates and updates the mean $\bar{\mathcal{R}}$ using the current role ordering. At line 9, the formation analysis system 200 calculates the change in the mean between the current and previous iteration. As shown in line 4, the formation analysis system 200 iterates the process shown in lines 4-10, a loop is started that iterates until either a change in mean $\nabla \bar{\mathcal{R}}$ between the current mean and the previous mean falls below a threshold, indicating convergence, or a maximum quantity of iterations is reached. At line 11, the formation analysis system 200 returns the role ordering for the current iteration $\hat{\mathcal{R}}$ as the final role ordering $\hat{\mathcal{R}}^*$.

FIG. 4 illustrates a set of team formations 400 after formation clustering, according to one embodiment of the present application. As shown, the set of team formations 400 includes six formation clusters 410(0)-410(5).

The first formation cluster 410(0) illustrates a 4-2-3-1 formation, where the players on the team form four ranks including four players, two players, three players, and one player, respectively. The second formation cluster 410(1) illustrates a 4-4-2 formation, where the players on the team form three ranks including four players, four players, and two players, respectively. The first formation cluster 410(0) illustrates a 4-1-4-1 formation, where the players on the team form four ranks including four players, one player, four players, and one player, respectively, and so on.

Once the formation analysis system 200 estimates the team formation and set of roles for a particular period of play, such as a game half, the formation analysis system 200 clusters the particular period with other similar periods to identify the dominant formations that are played over the course of an extended period, such as a full season. As further described below, the formation analysis system 200 measures the Earth Mover's Distance (EMD) to determine the differences between two formations. The formation analysis system 200 then performs agglomerative clustering via the $L_\infty$ norm, resulting in a set of team formations employed by one or more teams over an extended period, such as a season of play. As illustrated in FIG. 4, a given team employed a 4-2-3-1 formation 48.2% of the time, a 4-4-2 formation 23.0% of the time, a 4-1-4-1 formation 17.7%, a 3-5-2 formation 4.6% of the time, a 4-3-3 formation 3.3% of the time, and a 3-4-3 formation 3.2% of the time. In various embodiments, the formation analysis system 200 may generate set of team formations that includes any feasible quantity or type of formation clusters.

Because team formation and role assignments are independently determined for each period of play, the periods of play are aligned with each other in order to facilitate analysis. In one embodiment, the periods of play are aligned via the Hungarian algorithm, where each period of play is aligned to a reference period of play. By this process, the periods of play are aligned to each other. After the periods of play are aligned, the periods are clustered. To facilitate clustering, the movement of one or more players in the context of a given role may be represented by quantizing the playing field into an array of bins or sections. For example, the playing field could be divided into a non-overlapping array of bins, where each bin measures two meters by two meters. The tracking data for a given player is then expressed in terms of which bin the player occupies at each data frame, creating an occupancy map for the players. Cross-bin distances are then measured via the so-called Earth Mover's Distance (EMD). The EMD in (x,y) space between two histograms a and b is obtained by solving the "transportation problem" as expressed in Equation 5 below:

$$\min_{f_{qt} \geq 0} \sum_{q,t=1}^{D} d_{qt} f_{qt} \text{ s.t. } \sum_{q=1}^{D} f_{qt} = a^t, \sum_{t=1}^{D} f_{qt} = b^q \qquad \text{Equation 5}$$

given that the histograms a and b are normalized to unit mass. The variable $f_{qt}$ denotes a flow representing the amount transported from the qth supply to the tth demand, and $d_{qt}$ denotes the ground distance. The EMD measure described above provides a role-to-role comparison between two formations. The formation analysis system 200 then applies an $L_\infty$ norm to identify the roles that are different between the two given formations.

In an alternative embodiment, the formation analysis system 200 determines player role assignments, team formation, and formation clusters based on an entropy approach rather than a mean approach. With the entropy approach, the formation analysis system 200 first estimates the underlying formation of the team from player tracking data by finding the most probable set $\mathcal{F}^*$ of 2D probability distribution functions, as given by Equation 6 below:

$$\mathcal{F}^* = \underset{\mathcal{F}}{\operatorname{argmax}} P(\mathcal{F} \mid D) \qquad \text{Equation 6}$$

The formation analysis system 200 computes the 2D probability distribution function $P(X=x)$ which models the tracking data D. In other words, the formation analysis system 200 computes $P(x)$, which represents the heat-map for an entire team. Such a heat map may be modeled as a linear combination of the heat maps for each role, as shown in Equation 7 below:

$$P(x) = \sum_{n=1}^{N} P(x \mid n) P(n) \qquad \text{Equation 7}$$

$$= \frac{1}{N} \sum_{n=1}^{N} P_n(x)$$

Strategically, the players on a team typically spread out in order to provide adequate field coverage. As a result, the probability distribution functions corresponding to the players on the team are likely to exhibit minimal overlap. Equivalently, each individual role probability distribution function is likely to exhibit minimal overlap with the probability distribution function for the team as a whole. Given minimum entropy data partitioning, the formation analysis system 200 computes a divergence such as the Kullback-Lieber divergence, also referred to herein as KL divergence, to measure the overlap between two probability functions $P(x)$ and $Q(x)$, as shown in Equation 8 below:

$$KL(P(x) \| Q(x)) = \int P(x) \log\left(\frac{P(x)}{Q(x)}\right) dx \qquad \text{Equation 8}$$

where divergence is non-negative quantity such that completely overlapping probability distribution functions have zero divergence. The formation analysis system 200 employs a penalty function based on the negative divergence value between the heat map $P_n(x)$ of an individual role and the heat map of the team $P(x)$. An example of such a penaltry function is shown in Equation 9 below:

$$V_n = -KL(P_n(x) \| P(x)) \qquad \text{Equation 9}$$

The formation analysis system 200 computing the optimal formation $\mathcal{F}^*$ by determining the optimal set $\mathcal{F}^* = \{P_1(x), \ldots, P_N(x)\}^*$ of per-role probability distribution functions $P_n(x)$ that minimize the total overlap cost, as shown by Equation 10 below:

$$\mathcal{F}^* = \underset{\mathcal{F}}{\operatorname{argmax}} V \qquad \text{Equation 10}$$

Substituting the expressions for Kullback-Lieber divergence into the total overlap cost illustrates the dependence on each role-specific 2D probability distribution function, as shown in Equation 11 below:

$$V = \sum_{n=1}^{N} P(n)(-KL(P_n(x) \| P(x))) \qquad \text{Equation 11}$$

$$= -\sum_{n=1}^{N} P(n) \int P_n(x) \log\left(\frac{P(x)}{Q(x)}\right) dx$$

$$= -\sum_{n=1}^{N} P(n) \int P(x \mid n) \log P(x \mid n) dx +$$

$$\sum_{n=1}^{N} P(n) \int P(x \mid n) \log P(x) dx$$

The expression for V may be simplified when expressed in terms of entropy, as shown in Equation 12 below:

$$H(x) = \int_{-\infty}^{+\infty} P(x) \log(P(x)) dx \qquad \text{Equation 12}$$

The total overlap cost V, in terms of entropy, may then be expressed according to Equation 13 below:

$$V = -H(x) + \sum_{n=1}^{N} P(n) H(x \mid n) \qquad \text{Equation 13}$$

$$= -H(x) + \frac{1}{N} \sum_{n=1}^{N} H(x \mid n)$$

By substituting Equation 13 into Equation 10 and ignoring the constant term $H(x)$, an optimal formation may be expressed as the set of role-specific probability distribution functions that minimize the total entropy, as shown in Equation 14 below:

$$\mathcal{F}^* = \underset{\mathcal{F}}{\operatorname{argmin}} \sum_{n=1}^{N} H(x \mid n) \qquad \text{Equation 14}$$

As approximate solution to this equation may be computed using an expectation maximization (EM) approach, which is similar to k-means clustering. However, rather than assigning each data point to the closest cluster, the formation analysis system 200 solves a linear assignment problem between identities and roles using the Hungarian algorithm. The formation analysis system 200 arbitrarily assigns a unique role label to each of one or more players and assumes the assigned role label remains constant for the entire duration of the tracking data. As a result, each role probability distribution function is initialized using the tracking data of an individual player. The formation analysis system 200 iterates through each frame of the tracking data and assigns role labels to player positions by formulating a cost matrix based on the log probability of each position being assigned a particular role label. The formation analysis system 200 uses the Hungarian algorithm to compute the optimal assignment of role labels. Once role labels have been assigned to all frames of the tracking data, the formation analysis system 200 recomputes the probability distribution functions corresponding to each role. The process is repeated until convergence, or until a maximum quantity of iterations is performed, resulting in well-separated probability distribution functions similar to the probability distribution functions illustrated in FIG. 3. The formation analysis system 200 normalizes the tracking data in each frame to have a mean of zero in order to reduce or eliminate the effects of translation.

Once team formations have been discovered and clustered, as described above, the formation analysis system may employ the team formations and formation clusters in a variety of analysis applications, including, without limitation, (1) retrieving video of plays from prior games that match a behavior in a current game; (2) determining changes in team behavior, such as whether a team plays different at away games versus home games; (3) predicting team identity; (4) analyzing team style; and (5) predicting outcomes and detecting anomalies. Each of these applications are described in turn below:

Retrieving videos of plays from prior games, typically performed by retrieving plays tagged manually with one or more keywords, is facilitated by using formation detection described herein. In this application, a user specifies the start and end time of the video of the play of interest in a given game, such as three seconds leading up to a three-point shot attempt in basketball. In response, the formation analysis system 200 retrieves all plays which are similar from a tracking data archive that may include 20,000 or more three-point shot attempts. Plays may be classified as similar to the current play based on motion of the players and the ball, or other object of interest, and on the role assigned to the player making the three-point shot attempt. In one embodiment, feature correspondences are maintained by assigning roles based on the last data frame in the reference play as our permutation matrix and enforcing that role assignment during the entire play.

The formation analysis system 200 then retrieves previous plays that look visually similar to the input play, based on player trajectories and role assignments. In some embodiments, play retrieval may be based on both player and ball motion. In such an embodiment, player motion may be weighted differently than ball motion. An example of this is shown in Equation 15 below:

$$d_m = \arg\max(\|b_{in} - b_m\|_\infty, \lambda \| \mathcal{R}_{in} - \mathcal{R}_m \|_\infty) \quad \text{Equation 15}$$

$b_{in}$ and $b_m$ refer to the ball trajectory, and $\mathcal{R}_{in}$ and $\mathcal{R}_m$ refer to player trajectories, respectively, and $\lambda$ is the weighting factor of the player trajectories relative to the ball trajectory. In some embodiments, a separate weighting factor may be specified for the ball $\lambda_{ball}$ and for each of the players $\{\lambda_{player\ 1}, \lambda_{player\ 2}, \lambda_{player\ 3}, \ldots \lambda_{player\ n}\}$, where the ball weighing factor is a scalar and the players weighting factor is a vector that specifies an individual weighting factor for each of the n players.

The techniques described herein may be used to determine changes in team behavior, including, without limitation, whether a soccer team is more likely to concede a goal just after the team has scored, and whether the likelihood of scoring increases as the number of corners increases, and whether a team plays differently at away games versus home games. In the latter case, the formation analysis system 200 analyzes the home games for a given team as a group separately from the away games. The formation analysis system 200 performs formation discovery and cluster formation separately for the home games and the away games.

In one example, teams could exhibit approximately the same number of passes, passing accuracy, and shooting accuracy when playing at home and away. On the other hand, the teams could execute more shots and goals when playing at home, and the teams could score more points and maintain possession in the forward third more during home games. Using formation detection and clustering, the formation analysis system 200 could determine that the probability distribution functions associated with home games are more advanced on the field or court as compared with away games, even if the teams play approximately the same formations during home and away games. The formation analysis system 200 could compute the centroid of each formation and looked at each team's behavior when the team is home versus away, or, in the alternative, when the team is in possession versus when the opponent is in possession. The formation analysis system 200 could determine that teams play more forward when home than when away, regardless of which team is in possession. Such findings may be used by coaches to facilitate team strategy and by broadcasters and journalists to support game analysis.

The techniques described herein may also be used to identify teams based on team behavior associated with team formation during play. Formation discovery and clustering may be used to determine if teams exhibit a distinct playing style, such as by adopting specific formations at specific points during a game. The formation analysis system 200 may compare formation detection and clustering results for various other match descriptors to determine whether the formations adopted by a team correlate with these other match descriptors. These match descriptors include, without limitation, match statistics, and ball occupancy.

During a match, various match statistics are annotated to capture team and individual behavior. For soccer, these match statistics include, without limitation, goals, shots on target, shots off target, passes, corners, yellow cards, and red cards. These match statistics may be correlated with related information such as the time and location where a given event occurred and one or more players associated with the event, such as the time, location, and player associated with a goal.

Tracking data for an object of interest such as a ball may be stored in addition to player tracking data such that ball tracking data and player tracking data are correlated in time. The ball tracking data may be correlated with related information such as the team currently in possession of the ball. Ball tracking data may be represented as an estimate the continuous ball trajectory at each tracking data frame as well as which team had possession. Alternatively, ball tracking data may be represented by dividing the field into a spatial grid of bins, and identifying the relative time each team was in possession of the ball within each of the bins.

In some embodiments, the position of an object of interest such as a ball may be determined based on player positions. Ball tracking using such an approach may be improved by using player positions based on role assignment or representation rather than player identity. The motion of the ball may be segmented into two parts with respect to whether the ball is free (in the air) versus when the ball is owned or possessed by a player. When the ball is free (e.g. during a long pass to another player or a shot on goal), standard detection-linking methods may be applied. When the ball is owned or possessed by a player (e.g. when the ball is dribbled or carried) ball tracking may be improved by employing player positions based on role assignment or representations rather than on player identity. Unary potential, that is, the probability that a player (role) owns or posses the ball, may be based on prior knowledge of ball possession for each player (role). Pairwise potential, that is, how a player transition from a first role to a second role affects the probability of possession. The total probability that a particular player (role) possesses the ball at a given time is determined by combining unary probability and pairwise probability.

In some embodiments tracking using role assignment or representation may be enhanced by incorporating image data from game footage into the technique described above. With this approach, non-interest regions, such as portions of the image outside the boundaries of the court or field, are removed. Pixels within the image that are close in color to the game ball (such as the dark orange of a basketball) are extracted from the image. Motion segmentation is applied to temporally connect the extracted pixels. The extracted pixels are then connected to form regions via a region growing technique, and the boundaries of the regions are smoothed. Constraints are applied to select a region among the detected candidate regions based on the size of the object, length to width ratio of the object's minimum bounding rectangle, and the area ratio of the object versus the object's minimum bounding rectangle. Confidence values for each candidate object may be calculated and adjusted. A hough circle transform is applied to the candidate objects to detect whether a candidate is a round object (such as a basketball). Confidence values are increased for candidate objects determined to be round. Additionally, confidence values for a candidate object may be decreased if a candidate object is to close to a player's head, to reduce the probability that a player's head is mistakenly selected as the game ball.

In some embodiments, ball tracking data or ball prediction data, as described above, may be employed to enhance player detection and role assignment or representation. That is, if a certain frame has one or more detection errors, such as a missing detection or detection at an incorrect position, ball tracking or data or ball prediction data from prior and subsequent frames may be used to correct detection errors in the current frame.

The techniques described herein may also be used to discover and analyze the characteristic style of various teams. Team style is typically subjective and difficult to label, particularly in continuous sports such as soccer. Determining team style is further challenging due to the dynamic and low-scoring nature of such sports. In addition, sports that feature long periods of continuous play are difficult to segment into discrete parts, such as plays, and to assign labels to particular segments. In such cases, a team's style may be quantified as a linear combination of prior behavior styles based on historical tracking data.

Given a training set of team behavior descriptors, the formation analysis system 200 discovers a discrete set of styles using k-means clustering. The formation analysis system 200 generates style models based on tracking data related to a set of previous games as a "training" data set. The formation analysis system 200 projects the match features into a lower dimensional, discriminative space using linear discriminant analysis, also referred to herein as LDA, as described above in conjunction with discovering team identity. As referred to herein, match features include a ratio based on two or more match statistics or a subset of the match statistics. The formation analysis system 200 then clusters similar examples via an appropriate quantity of k styles, such as k=5, 10 or 20. For example, if k=5, then the formation analysis system 200 could generate a style vector for a team of the form, where each element of the vector is a normalized weight that represents the likelihood that the team adopts the style corresponding to the element. For k=5, if team A has a style vector of [0; $27/28$; $1/28$; 0; 0], then team A plays the second style $27/28$ of the time and the third style $1/28$ of the time and does not play the first, fourth, or fifth styles. Correspondingly, if team B has a style vector of [$30/32$; $1/32$; $1/32$; 0; 0], then team B plays the first style $30/32$ of the time, the second style $1/32$ of the time, and the third style $1/32$ of the time and does not play the fourth or fifth styles.

Modeling teams via such style vectors provides a mechanism to describe a team that varies play style according to various circumstances, such as a team that plays a pressing game under certain conditions or a defensive game under other conditions, versus a team that plays a rigid style that rarely changes under varying circumstances. Style vectors are reflective of how a team varies style of play, and may be employed to assist prediction of outcomes.

The techniques described herein may also be used to analyze team behaviors in order predict outcomes and detect anomalies. For example, given the identity of two teams playing a match, the formation analysis system 200 analyzes historical tracking data in order to predict an outcome associated with the match or to determine when one or both team are playing differently in the current match versus previous matches.

To predict the most likely match features for a current match, the formation analysis system 200 employs k nearest neighbor regression, also referred to herein as K-NN regression, using the learned team style, described above, as input. The formation analysis system 200 selects matches where actual match features regress from predicted match features. That is, for a match being analyzed, such as a test match, the formation analysis system 200 compares styles of the two teams for the test match to the teams' historical style vectors. The formation analysis system 200 retrieves the matches that are most similar to the test match in terms of team styles. The formation analysis system 200 calculates the mean match features in order to predict the outcome of the test match. The formation analysis system compares predicted match features with the actual match features. Predicted match features that are not well correlated to actual match features suggests that one or both teams were not playing their normal formation style during the test matches. Predicted behavior may thus be used to determine more likely formations and outcomes based on prior matches and to detect anomalous behavior exhibited by one or both teams in a match.

It should be appreciated that the architecture described herein is illustrative only and that variations and modifications are possible. For example, the techniques are described in the context of soccer and basketball. However, the described techniques may be applied to any feasible activity within the scope of this disclosure, including, without limitation, other adversarial sports, movements of groups of actors in a public space, such as a theme park, and objects controlled by actors to achieve a goal, such as planes flying in formation in order to reduce drag and improve fuel efficiency, movement of vessels through a waterway, movement of animals through a preserve, or movement of infectious agents, such as viruses and bacteria.

Figure 5A:
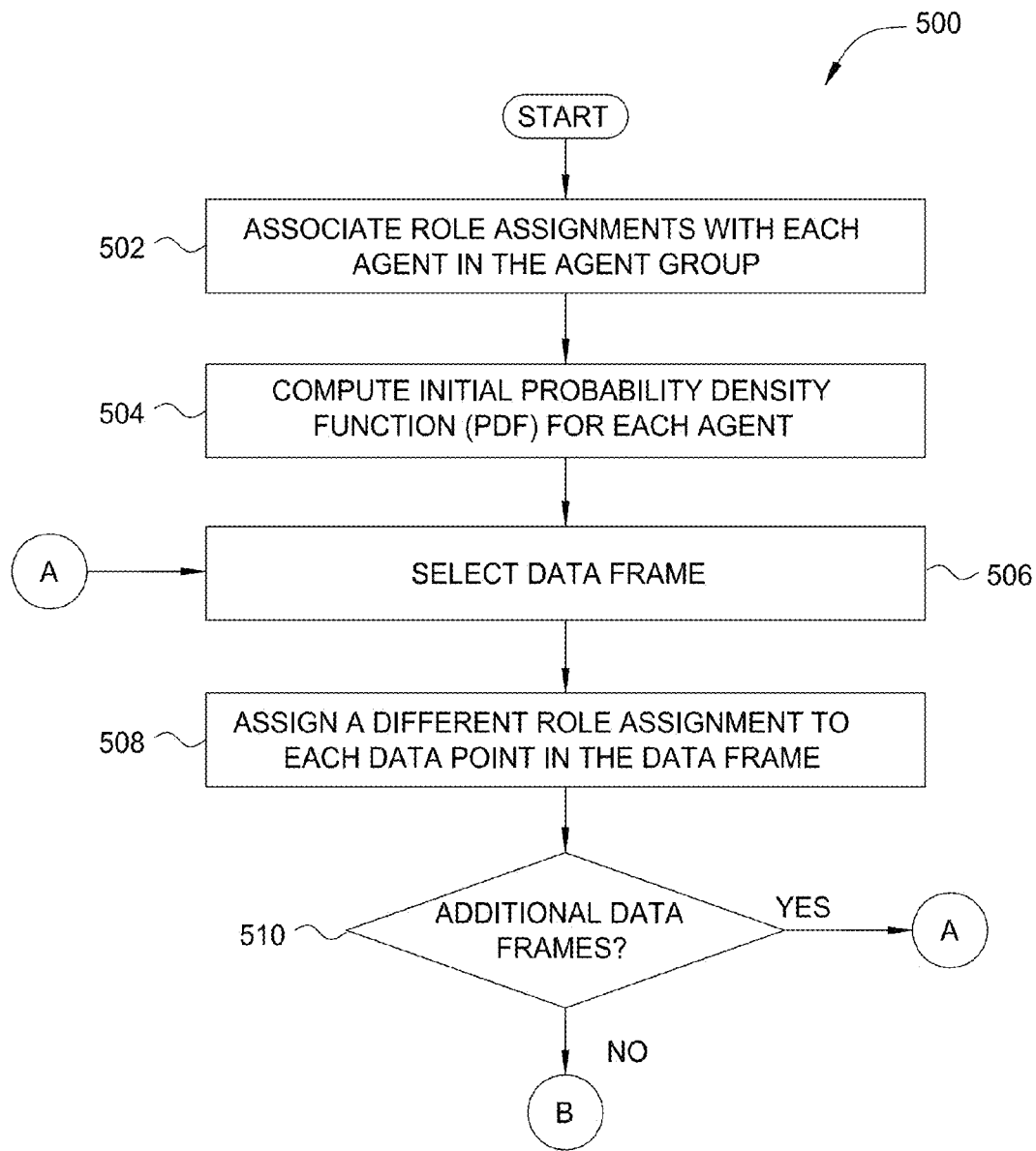
FIGS. 5A-5B set forth a flow diagram of method steps for discovering a formation associated with a first agent group engaging in an activity, according to one embodiment of the present application.
Figure 5B:
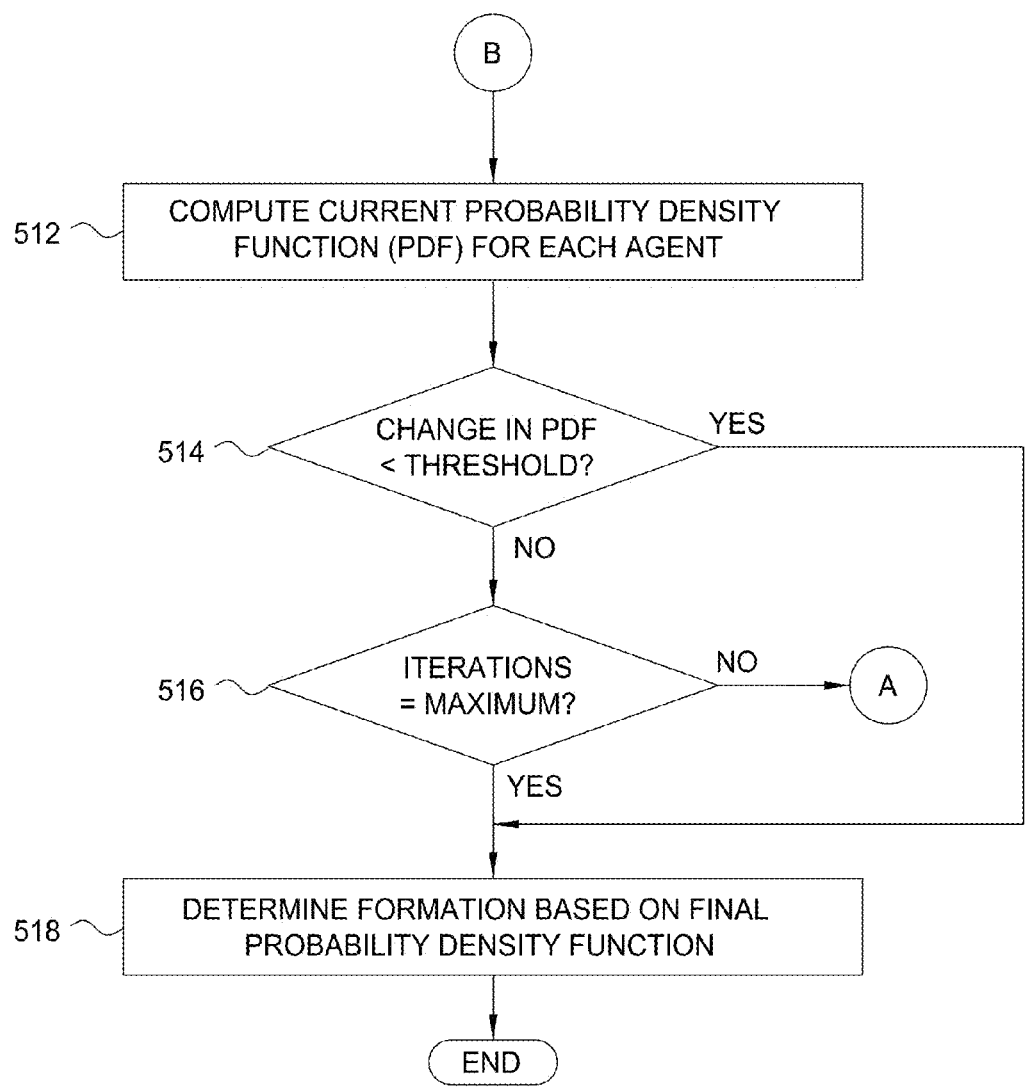

FIGS. 5A-5B set forth a flow diagram of method steps for discovering a formation associated with a first agent group engaging in an activity, according to one embodiment of the present application. Although the method steps are described in conjunction with the systems of FIGS. 1-4, persons of ordinary skill in the art will understand that any system configured to perform the method steps, in any order, is within the scope of the application.

As shown, a method 500 begins at step 502, where the formation analysis system 200 associates a different role assignment from a set of role assignments to one or more agents in an agent group, such as to one or more players on a team of players in a sports match. At step 504, the formation analysis system 200 computes an initial probability distribution function for each agent in the agent group. At step 506, the formation analysis system 200 selects a data frame from the tracking data of a match undergoing analysis. At step 508, the formation analysis system 200 associates a different role assignment from the set of role assignments to each data point in the data frame, where each data point corresponds to a location of one of the agents.

At step 510, the formation analysis system 200 determines whether the tracking data includes additional data frames for processing. If the tracking data includes additional data frames, then the method 500 proceeds to step 506, described above. If, however, at step 510, the tracking data does not include additional data frames, then the method 500 proceeds to step 512, where the formation analysis system 200 computes a current probability distribution function for each agent in the agent group.

At step 514, the formation analysis system 200 determines whether the change between the current probability distribution function and the previously computed probability distribution function is less than a threshold value, indicating convergence. If the change is not less than the threshold value, then the method 500 proceeds to step 516, where the formation analysis system 200 determines whether the quantity of iterations through the loop defined by steps 506-516 has reached a maximum quantity of iterations. If the quantity of iterations through the loop has not reached a maximum, then the method proceeds to step 506, described above. If, however, the quantity of iterations through the loop has reached a maximum, then the method proceeds to step 518, where the formation analysis system 200 determines a team formation based on the final probability distribution function. The final probability distribution function corresponds to the probability distribution function computed during the most recent computation performed in step 512. The method 500 then terminates.

Returning to step 514, if the change is less than the threshold value, then the method 500 proceeds to step 516, described above.

In sum, a formation analysis system discovers a formation associated with a group of agents engaging in an activity. Per-frame tracking data for the players is collected over a period of time. A function is performed on the tracking data to determine an initial role ordering that maps a different role to each of one or more players. The function may be a measure of the mean position of one or more players over the period of time. Alternatively, the function may be a measure of the entropy of the position of one or more players over the period of time. The formation analysis system computes an overall team mean or entity based on the individual means or entities. The formation analysis system then iterates by assigning a different potential player to role assignment, measuring the new mean or entropy of the individual and team metrics, and then computes the change in mean or entropy versus the previous iteration. The formation analysis system continues to iterate until the change in mean or entropy falls below a threshold, indicating that convergence has been achieved, or until a maximum quantity of iterations is performed.

As a result, team formation and player role data are automatically determined from player tracking data. This team formation and player role data may be used to facilitate various applications that leverage historical play data, including, without limitation, analysis by coaches to determine strategy for future games, analysis by sports analysis and broadcasters to support commentary before, during, and after games, and predicting future team behavior and outcomes based on prior team behavior. This team formation and player role data may be used to improve data tracking by identifying and removing anomalous tracking data.

The flowchart and block diagrams in the Figures illustrate the architecture, functionality, and operation of possible implementations of systems, methods and computer program products according to various embodiments of the present application. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts, or combinations of special purpose hardware and computer instructions.

While the foregoing is directed to embodiments of the present application, other and further embodiments of the application may be devised without departing from the basic scope thereof, and the scope thereof is determined by the claims that follow.

What is claimed is:

1. A method comprising:
  receiving a plurality of data frames specifying location data for each of a plurality of agents, at a plurality of discrete time instances over a window of time, wherein the location data comprises a location of the respective agent in a physical space, and wherein the location data is collected using one or more electronic sensor devices;
  creating an initial assignment of a plurality of roles to the plurality of agents for the window of time;
  generating a plurality of probability distribution functions for the plurality of roles, each defining a location of an agent assigned to each respective role during the window of time;
  iteratively determining, by operation of one or more computer processors, a first formation of the plurality of agents over the window of time, comprising, for each of one or more iterations:

creating, for each of the plurality of data frames, an assignment of the plurality of roles to the plurality of agents using the plurality of probability distribution functions;

modifying the plurality of probability distribution functions based on the assignment of the plurality of roles to the plurality of agents, wherein each of the modified probability distribution functions defines a location of an agent assigned to each respective role in each respective data frame;

retrieving one or more instances of digital video content from a content repository using the first formation, wherein each of the one or more instances of digital video content depicts a formation that is similar to the first formation; and transmitting the one or more instances of digital video content for output to a client.

2. The method of claim 1, wherein each probability distribution function comprises a mean position associated with a respective role during the window of time.

3. The method of claim 1, wherein each probability function comprises an entropy value associated with a respective role during the window of time.

4. The method of claim 1, wherein the plurality of agents are a first agent group in a plurality of agent groups, the method further comprising distinguishing the first agent group from all other agent groups in the plurality of agent groups based on the first formation.

5. The method of claim 1, further comprising predicting a second formation associated with the plurality of agents based on the first formation.

6. The method of claim 1, wherein creating, for each of the plurality of data frames, an assignment of the plurality of roles to the plurality of agents comprises:
assigning a first role to a first agent for a first data frame; and
assigning a second role to the first agent for a second data frame.

7. The method of claim 1, further comprising, for each data frame in the plurality of data frames, normalizing the location data such that a mean value associated with the location data is equal to zero.

8. The method of claim 1, wherein the plurality of data frames further specify a position of an object of interest, and wherein the first formation is further determined based at least in part on the position of the object of interest.

9. A non-transitory computer-readable storage medium including instructions that, when executed by a processor, cause the processor to perform an operation comprising:
receiving a plurality of data frames specifying location data for each of a plurality of agents, at a plurality of discrete time instances over a window of time, wherein the location data comprises a location of the respective agent in a physical space, and wherein the location data is collected using one or more electronic sensor devices;
creating an initial assignment of a plurality of roles to the plurality of agents for the window of time;
generating a plurality of probability distribution functions for the plurality of roles, each defining a location of an agent assigned to each respective role during the window of time;
iteratively determining, by operation of one or more computer processors, a first formation of the plurality of agents over the window of time, comprising, for each of one or more iterations:
creating, for each of the plurality of data frames, an assignment of the plurality of roles to the plurality of agents using the plurality of probability distribution functions;

modifying the plurality of probability distribution functions based on the assignment of the plurality of roles to the plurality of agents, wherein each of the modified probability distribution functions defines a location of an agent assigned to each respective role in each respective data frame;

retrieving one or more instances of digital video content from a content repository using the first formation, wherein each of the one or more instances of digital video content depicts a formation that is similar to the first formation; and transmitting the one or more instances of digital video content for output to a client.

10. The non-transitory computer-readable storage medium of claim 9, wherein each probability function comprises a mean position associated with a respective role during the window of time.

11. The non-transitory computer-readable storage medium of claim 9, wherein each probability function comprises an entropy value associated with a respective role assignment during the window of time.

12. The non-transitory computer-readable storage medium of claim 9, wherein the plurality of agents are a first agent group in a plurality of agent groups, the operation further comprising distinguishing the first agent group from all other agent groups in the plurality of agent groups based on the first formation.

13. The non-transitory computer-readable storage medium of claim 9, further comprising predicting a second formation associated with the plurality of agents based on the first formation.

14. The non-transitory computer-readable storage medium of claim 9, wherein the plurality of data frames further specify a position of an object of interest, wherein the first formation is further determined based at least in part on the position of the object of interest.

15. A computing system, comprising:
a memory that is configured to store instructions for a program; and
a processor that is configured to execute the instructions for the program to perform an operation comprising:
receiving a plurality of data frames specifying location data for each of a plurality of agents, at a plurality of discrete time instances over a window of time, wherein the location data comprises a location of the respective agent in a physical space, and wherein the location data is collected using one or more electronic sensor devices;
creating an initial assignment of a plurality of roles to the plurality of agents for the window of time;
generating a plurality of probability distribution functions for the plurality of roles, each defining a location of an agent assigned to each respective role during the window of time;
iteratively determining, by operation of one or more computer processors, a first formation of the plurality of agents over the window of time, comprising, for each of one or more iterations:
creating, for each of the plurality of data frames, an assignment of the plurality of roles to the plurality of agents using the plurality of probability distribution functions;

modifying the plurality of probability distribution functions based on the assignment of the plurality of roles to the plurality of agents, wherein each of the modified probability distribution functions defines a location of an agent assigned to each respective role in each respective data frame;

retrieving one or more instances of digital video content from a content repository using the first formation, wherein each of the one or more instances of digital video content depicts a formation that is similar to the first formation; and transmitting the one or more instances of digital video content for output to a client.

16. The method of claim 1 wherein creating, for each of the plurality of data frames, an assignment of the plurality of roles to the plurality of agents using the plurality of probability distribution functions comprises formulating a cost matrix based on the log probability of each role being assigned to a particular agent.

17. The non-transitory computer-readable storage medium of claim 9 wherein creating, for each of the plurality of data frames, an assignment of the plurality of roles to the plurality of agents using the plurality of probability distribution functions comprises formulating a cost matrix based on the log probability of each role being assigned to a particular agent.

18. The computing system of claim 15 wherein creating, for each of the plurality of data frames, an assignment of the plurality of roles to the plurality of agents using the plurality of probability distribution functions comprises formulating a cost matrix based on the log probability of each role being assigned to a particular agent.

19. The non-transitory computer-readable storage medium of claim 9, wherein creating, for each of the plurality of data frames, an assignment of the plurality of roles to the plurality of agents comprises:
assigning a first role to a first agent for a first data frame; and
assigning a second role to the first agent for a second data frame.

20. The system of claim 15, wherein creating, for each of the plurality of data frames, an assignment of the plurality of roles to the plurality of agents comprises:
assigning a first role to a first agent for a first data frame; and
assigning a second role to the first agent for a second data frame.

* * * * *

UNITED STATES PATENT AND TRADEMARK OFFICE
CERTIFICATE OF CORRECTION

PATENT NO. : 10,062,033 B2
APPLICATION NO. : 14/498977
DATED : August 28, 2018
INVENTOR(S) : Patrick Lucey et al.

It is certified that error appears in the above-identified patent and that said Letters Patent is hereby corrected as shown below:

On the Title Page

On the page 2, in Column 2, under "Other Publications", Line 40, delete "MITA" and insert -- MIT --, therefor.

In the Specification

In Column 13, Line 44, delete "D" and insert -- $\overline{\mathcal{D}}$ --, therefor.

In Column 13, Line 57, delete "D" and insert -- $\overline{\mathcal{D}}$ --, therefor.

In Column 14, Line 3, delete "R" and insert -- $\overline{\mathcal{R}}$ --, therefor.

In Column 14, Line 8, delete "R" and insert -- $\overline{\mathcal{R}}$ --, therefor.

Signed and Sealed this
Sixth Day of November, 2018

Andrei Iancu
*Director of the United States Patent and Trademark Office*